(No Model.)

W. A. BEEBE.
TIRE REGULATOR.

No. 541,828. Patented July 2, 1895.

Witnesses
C A Ford
John H Siggers

Inventor
Walter A. Beebe
By his Attorneys,
C A Snow & Co.

UNITED STATES PATENT OFFICE.

WALTER A. BEEBE, OF KING CITY, CALIFORNIA.

TIRE-REGULATOR.

SPECIFICATION forming part of Letters Patent No. 541,828, dated July 2, 1895.

Application filed August 15, 1894. Serial No. 520,382. (No model.)

*To all whom it may concern:*

Be it known that I, WALTER A. BEEBE, a citizen of the United States, residing at King City, in the county of Monterey and State of California, have invented a new and useful Tire-Regulator, of which the following is a specification.

My invention relates to improvements in tire-regulators, the objects in view being to provide a tire so constructed as to be regulated, that is, either loosened or tightened upon the rim of the wheel and locked in any of such regulated positions, and to provide means for locking the said tire when regulated.

With these objects in view, the invention consists in certain features of construction hereinafter specified and particularly pointed out in the claims.

Figure 1:
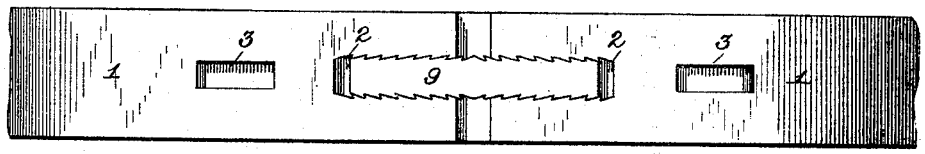
Figure 2:
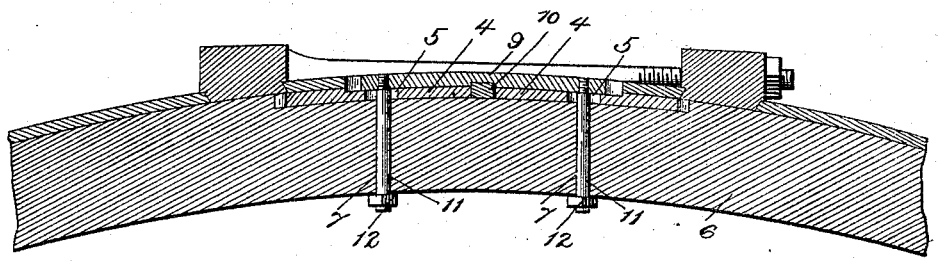
Figure 5:
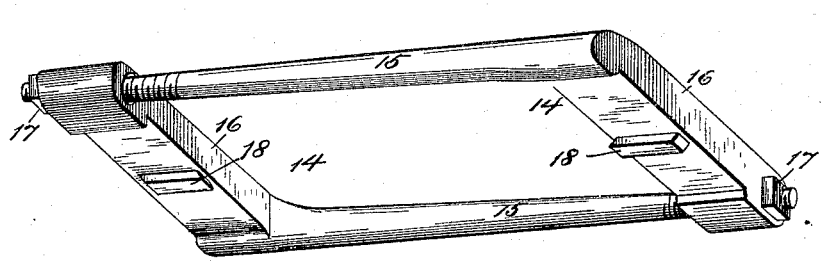
Figure 4:
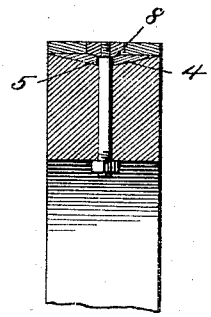
Figure 6:
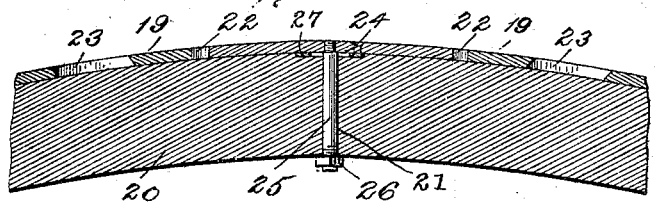
Figure 3:
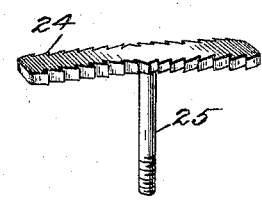

Referring to the drawings, Figure 1 is a plan or edge view of a portion of a wheel or tire constructed in accordance with my invention. Fig. 2 is a longitudinal sectional view of Fig. 1 the clamp being in position. Fig. 3 is a detail in perspective of the locking device. Fig. 4 is a transverse sectional view. Fig. 5 is a detail in perspective of the clamp. Fig. 6 is a longitudinal section of a modified construction of tire.

Like numerals of reference indicate like parts in all the figures of the drawings.

1 1 designate the meeting ends of the tire, and the same are provided at their extremities with opposite slots 2, the walls of which are parallel to each other when viewed longitudinally and when viewed in cross-section are also parallel, but may be inclined if desired. The parallel edges of the slots 2 are provided with a series of inwardly-disposed registering teeth, the same being inclined and those of one wall or edge agreeing with those at the opposite side. A short distance in rear of the slots 2 are openings 3, the front walls of which are preferably undercut, as shown, and these may extend entirely through the tire, or only partially through, in other words, forming sockets if so desired.

The inner faces of the slotted portions of the tire are covered by means of transverse strips 4, which are preferably convexed on their under sides and are provided with elongated slots 5 that register with, though not as long as, the slots 2 of the tire. The tire thus constructed is mounted upon the rim 6 of the wheel, which rim is provided with perforations 7 which register with the recesses 2 of the tire. The rim is further provided with a groove at this point for the reception of the cross-pieces or strips 4, and the upper sides of these strips are provided with V-shaped grooves 8.

The locking device consists of an oblong head 9, which at opposite sides of its center is provided with inwardly-disposed teeth, that is, the teeth are inclined and disposed toward the center, so that those teeth at one side of the center are disposed contrary to those at the opposite side. This head 9 is designed to fit within the slots 2, and the teeth of the head interlock with the teeth of said slots. The under side of the head is convexed or V-shaped, so as to fit within the V-shaped groove 8 of the strips or cross-pieces 4. A central stud 10 is located upon the under side of the head, and near the ends of the head are located depending bolts 11, which have their extremities threaded and extend through the perforations 7 with which the rim of the wheel is provided, as before mentioned. Below the rim of the wheel these bolts are provided with nuts 12, whereby when the locking head is once in position the same may be secured through the medium of the nuts.

It will be seen that by first removing the locking-head from the slots of the tire, which may be accomplished by a loosening of the nuts of the bolts and a partial withdrawal of the locking-head, said tire may be drawn together or enlarged as may be necessary, in accordance with the shrinkage or expansion of the rim, and that subsequently by reinserting the locking-head within the slots and a re-tightening of the nuts, the said tire is locked in its adjusted position.

Various means may be provided for drawing the tire together, and I have herein shown one form of clamp that I have found convenient for the purpose.

Reference is now had to Fig. 5 of the drawings, and it will be seen that the locking device consists of two L-shaped members 14, two of the branches of which form spindles 15, and are provided at their extremities with screw-threads, while the remaining branches 16 are provided near their extremities with openings each for the reception of the spindle portion of the opposite member, through which openings said spindle-portions project and extend therebeyond. Nuts 17 are mounted upon the spindle-portions and serve to bind against the outer edges of the branches 16. The branches 16 are recessed upon their under sides so as to embrace the tire, and are provided at the centers of their recesses with depending lugs 18, whose inner edges are undercut or beveled and are designed to engage with the openings or cavities 3 of the tire. It will be seen that the clamp is open in its center so that when placed upon the tire free access may be had to the locking device, which after having been loosened or disconnected from its locked position, as before described, may be partially withdrawn. The binding-nuts 17 of the clamp may now be operated by an ordinary wrench, and as the members are drawn together so also are the ends of the tire, and when sufficiently drawn together the locking device may be reinserted and its nuts tightened, all without removing the clamp.

From the foregoing description in connection with the accompanying drawings it will be seen that I have provided an exceedingly cheap and simple means for regulating the size of the tire and compensating for any shrinking or expansion of the rim that may take place, and furthermore that the entire adjustment may be accomplished without any welding or other operation requiring skilled labor.

Referring to Fig. 6, I have illustrated a slightly modified construction of tire, and the same consists simply in employing but one bolt in lieu of two as heretofore described. In this figure 19 designates the ends of the tire, 20 the rim, and the same has a perforation 21 intermediate the ends of said tire. The tire has the usual toothed recesses 22 at its ends, and beyond the same are sockets or cavities 23 to be engaged with the clamp. 24 designates the toothed locking head, and 25 the bolt which depends from the center of the same through the rim, and is provided with a nut 26. The operation of this modification is precisely the same as that heretofore described, the only difference being that instead of having to loosen and tighten two bolts, in this instance but one bolt is loosened and tightened to secure a regulation or adjustment of the tire. In this instance also the cross pieces 4 employed in the previous construction are omitted, and simple cross-strips 27 are employed, the same having their ends riveted, as shown by dotted lines, to the opposite sides of the slots 22.

Having described my invention, what I claim is—

1. The combination with a rim, and a tire mounted thereon and having its ends adjacent each other and provided with longitudinal slots having opposite toothed edges, of a locking head adapted to fit within the slots and provided at its sides with teeth for engaging those of the edges, and means for retaining said locking-head within the slots, substantially as specified.

2. The combination with a rim and a tire, the latter having its ends adjacent each other and slotted and the opposite edges of the slots provided with teeth, of a head fitting removably within the slots and provided at its opposite edges with teeth for engaging those of the slots and provided with a bolt extending therefrom through the rim beyond which it is nutted, substantially as specified.

3. The combination with a rim, of a tire having its ends slotted and provided with teeth, and having in rear of the slots, openings adapted to be engaged by a clamp or straining device for drawing the ends of the tire together, and a toothed locking head engaging the teeth of the slots, substantially as described.

4. The combination with a rim having an opening, a tire mounted on the rim and having its ends terminating at opposite sides of the opening and provided with slots, the edges of said slots being provided with teeth inwardly disposed, of a locking-head fitting removably in the slots and connecting the ends of the tire and having its edges provided at opposite sides of its center with inwardly-inclined teeth for engaging those of the slots, and a bolt extending from the head through a perforation in the rim and provided with a nut, substantially as specified.

5. The combination with a rim having a groove in its exterior, a tire mounted on the rim and having its ends adjacent each other and provided at its ends with slots having teeth, cross-pieces connecting the slotted portions of the tire and provided with convexed faces for fitting the rim, of a locking-head having its opposite ends located in the slots and provided with teeth for engaging the teeth of the slots, a bolt extending from the locking-head through the rim, and a nut for the bolt, substantially as specified.

6. The combination with a rim having a pair of openings, and a groove, of a tire encircling the rim and having its adjacent ends slotted above the openings and provided at the edges of their slots with teeth, a locking-head fitting the slots and provided with teeth for engaging those of the slots, cross-pieces secured to the under side of the tire opposite the slots, and convexed to fit the rim, and provided with slots registering with those of the tire, a locking-head mounted removably in the slots of the tire and provided with teeth for engaging the same, and a pair of bolts depending from the head and extending through the slots of the cross-pieces and through the perforations in the rim beyond which they are nutted, substantially as specified.

In testimony that I claim the foregoing as my own I have hereto affixed my signature in the presence of two witnesses.

WALTER A. BEEBE.

Witnesses:
W. B. WELLER,
W. M. ARMSTRONG.